L. Howe.
Road Scraper.
No. 95,690.  Patented Oct. 12, 1869.
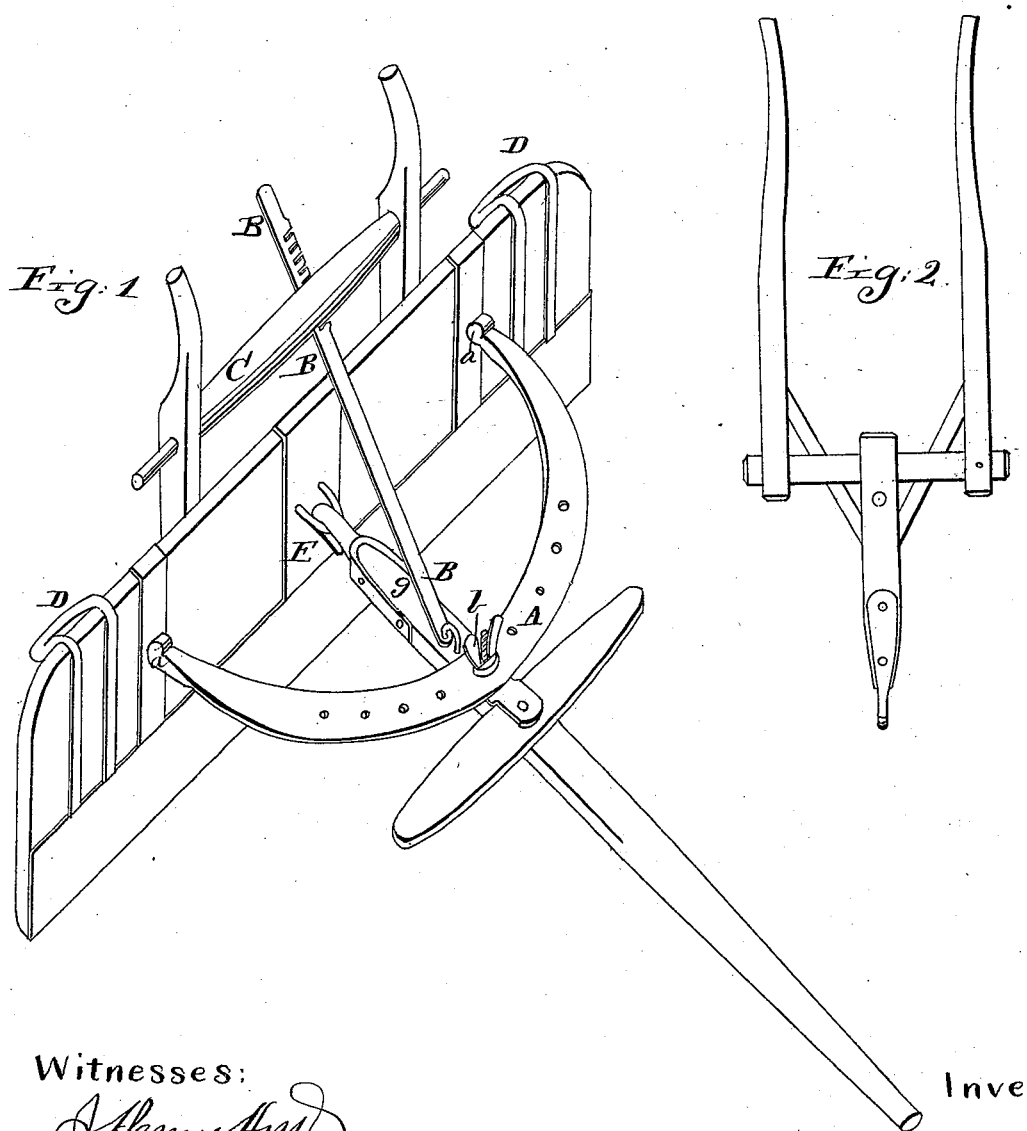
Witnesses:
J. Henry Hind
A. C. Munroe
Inventor:
Lyman Howe

United States Patent Office.

LYMON HOWE, OF WORCESTER, ASSIGNOR TO HIMSELF, JONATHAN LUTHER, OF SAME PLACE, AND MOSES W. WHEELER, OF MILLBURY, MASSACHUSETTS.

Letters Patent No. 95,690, dated October 12, 1869.

IMPROVED ROAD-SCRAPER.

The Schedule referred to in these Letters Patent and making part of the same.

*To all whom it may concern:*

Be it known that I, LYMON HOWE, of the city and county of Worcester, and Commonwealth of Massachusetts, have invented a new and useful Improvement on Scrapers for Building Roads and Removing Earth or Snow; and I do hereby declare that the following is a full and exact description thereof, reference being had to the accompanying drawings, and to the letters of reference marked thereon, making a part of this specification.

The nature of my invention consists in improved appliances for operating and regulating the working of scrapers, whereby the scraper is easily placed at any required angle for scooping the earth, or dumping, or turning it to one side. In making roads, the earth can be scooped from the sides or gutters, and turned toward the centre of the road, similar to that of plowing, by means of an arc or half circle, which I place in front of the scraper, and attach it by hooks or hinges, and attach the front of the arc to the pole or thills, with an adjustable bolt, and by means of a ratchet-lever, running from the pole or thills, to the round in the handles, which round turns in the handles to accommodate the angle of the lever, and having a pin or bolt for the ratchet, the scraper is thus held in any required position for scraping or plowing, and may be dumped with ease by one man operating it. Two iron fulcra are placed near the ends, and on the upper edge of the scraper, for the purpose of using levers to bear the scraper in when being used as a plow. I attach the pole or thills to the scraper by means of a hook, and it is easily detached for transportation.

To enable others skilled in the art to make and use my invention, I will proceed to describe its construction and operation.

Figure 1 represents a scraper made of wood and iron, with my appliances, to be used with a pole or thills.

Figure 2 represents the thills.

The scraper may be made of iron, or of wood and iron. The appliances are as easily attached to the iron scoop or scraper as to the one made of wood and iron.

In the drawing—

A represents an arc or half circle made of iron, and attached to the front of the scraper by hinges or hooks $a\ a$, said arc of iron having holes through it for the purpose of adjusting the scraper, by nut and bolt $b$, to the pole or thills $g$, thus holding it at the desired angles, or for square scraping.

B B B represent a ratchet-lever, made of iron or wood, attached to the pole or thills $g$, and extending through the rounds C, in the handles of the scraper, at which point the ratchet catches on a pin or bolt in said round, and thus holds the scraper in any desired position for scooping or plowing, and may be thrown out at once with ease for dumping.

The round C may be made of iron or wood, and turns in the handles to accommodate the variation of the ratchet-lever.

D D represent two iron fulcra for the use of levers to bear the scraper in when used as a plow.

The pole or thills being attached by means of hook E, are easily detached for transportation.

What I claim as my invention, and desire to secure by Letters Patent, is—

1. A road-scraper, consisting of the shaft attached to the scraper-board at E, the arc A, pivoted also to the board, and having holes to allow the shaft or thills to be turned aside, the ratchet-bar B and round C, turning in the handles, all constructed and arranged to operate as and for the purpose set forth.

2. In combination with such a scraper, the ears D D, as and for the purpose set forth.

LYMON HOWE. [L. S.]

Witnesses:
J. HENRY HILL,
A. C. MUNROE.